United States Patent [19]
Hoxmeier

[11] Patent Number: 5,281,666
[45] Date of Patent: Jan. 25, 1994

[54] PROCESS FOR MAKING BLOCK COPOLYMERS OF VINYL AROMATIC HYDROCARBONS AND/OR CONJUGATED DIENES AND POLYDIMETHYLSILOXANE

[75] Inventor: Ronald J. Hoxmeier, Houston, Tex.

[73] Assignee: Shell Oil Company, Houston, Tex.

[21] Appl. No.: 990,913

[22] Filed: Dec. 15, 1992

[51] Int. Cl.$^5$ .................... C08F 295/00; C08C 19/25
[52] U.S. Cl. .................................. 525/105; 525/106; 528/14; 528/25
[58] Field of Search ............... 525/479, 100, 106, 105; 528/14, 25

[56] References Cited

U.S. PATENT DOCUMENTS

| | | | |
|---|---|---|---|
| 3,051,684 | 8/1962 | Morton et al. | 528/14 |
| 3,483,270 | 12/1969 | Bostick | 525/479 |
| 3,665,052 | 5/1972 | Saam et al. | 525/479 |
| 3,691,257 | 9/1972 | Kendrick | 525/479 |
| 3,760,030 | 9/1973 | Dean | 525/479 |
| 3,928,490 | 12/1975 | Hergenrother | 525/479 |
| 4,143,089 | 3/1979 | Martin | 525/271 |
| 4,148,838 | 4/1979 | Martin | 525/271 |
| 4,263,401 | 4/1981 | Chaumont et al. | 525/106 |
| 4,273,896 | 6/1981 | Martin | 525/271 |
| 4,768,750 | 11/1990 | Eichenauer et al. | 525/479 |

OTHER PUBLICATIONS

Polymer Letters, vol. 8 pp. 677–679, 1970.
J. C. Saam, D. J. Gordon, S. Lindsey, *Macromolecules*, 3 (1), pp. 1–4 (1970).
I. Jansen, G. Lohmann, K. Rühlmann, *Siloxanes with Functional Groups. V. Long-term Stabilization of Polymers. I. Preparation and Properties of Styrene-Siloxane Block Copolymers*, Plaste Kautsch, 31(12), pp. 441–447.
P. Bajaj, S. K. Varshney, A. Misra, *Block Copolymers of Polystyrene and Poly(Dimethyl Siloxne). I. Synthesis and Characterization*, J. of Poly. Sci.: Polymer Chem. Ed., vol. 18, (1980) pp. 295–309.

*Primary Examiner*—Ralph H. Dean
*Attorney, Agent, or Firm*—Donald F. Haas

[57] ABSTRACT

The present invention is an improvement upon the process for making block copolymers of vinyl aromatic hydrocarbons and/or conjugated dienes, and polydimethylsiloxane by first anionically polymerizing the vinyl aromatic hydrocarbon to make a living polymer block and then adding hexamethylcyclotrisiloxane and a polar promoter to polymerize a polydimethylsiloxane block at the end of the living polymer block. The improvement comprises reacting the living polymer blocks with a crossover reagent to decrease the crossover time from the living polymer block polymerization to the polydimethylsiloxane polymerization.

4 Claims, No Drawings

PROCESS FOR MAKING BLOCK COPOLYMERS OF VINYL AROMATIC HYDROCARBONS AND/OR CONJUGATED DIENES AND POLYDIMETHYLSILOXANE

BACKGROUND OF THE INVENTION

This invention relates to an improved process for making block copolymers of vinyl aromatic hydrocarbons and/or conjugated dienes and polydimethylsiloxane. More specifically the invention relates to the use of specific crossover reagents to speed up the process for making such block copolymers.

Linear block copolymers of polystyrene and polydimethylsiloxane have been synthesized, both by graft and block copolymerization. In block copolymerization of such linear polymers, polystyrene is produced by anionic polymerization with an organo lithium promoter and the living polymer (PS$^-$Li$^+$) created thereby is reacted with hexamethylcyclotrisiloxane, (Me$_2$SiO)$_3$, in the presence of a polar ether promoter wherein a block of polydimethyl-siloxane grows on the end of the living vinyl aromatic hydrocarbon polymer block.

The kinetics of the polymerization reaction of styrene are quite good and the reaction proceeds relatively quickly. Unfortunately, the crossover reaction for the living polystyrene polymer blocks to begin the growth of the polydimethylsiloxane blocks on the ends thereof exhibits considerably less favorable reaction kinetics, causing the reaction to be quite slow. This is the reaction from PS$^-$LI$^+$ to PS—[Si(Me)$_2$O]$_2$—Si(Me)$_2$O$^-$Li$^+$. This reaction generally requires a large excess of hexamethylcyclotrisiloxane monomer—a monomer to lithium ratio on the order of 100 to 1—to drive it to completion. The large excess results in significant die-out of the living polystyrene blocks due to impurities in the siloxane monomers, thereby generating homopolystyrene and possibly adversely affecting the desired molecular weight for the polydimethylsiloxane block copolymer.

Thus, it would be advantageous to provide an improved process which does not require a large excess of hexamethylcyclotrisiloxane monomer to decrease the cost and to minimize the die-out of the polystyrene blocks. The present invention provides such an improved process.

SUMMARY OF THE INVENTION

The present invention encompasses an improved process for making the block copolymers discussed above. This process comprises first anionically polymerizing a vinyl aromatic hydrocarbon and/or a conjugated diene to produce living polymer arms. The next step is polymerizing the living polymer arms with hexamethylcyclotrisiloxane in the presence of a polar promoter and the final step is terminating the polymerization to produce a block copolymer of the original monomer(s) and polydimethylsiloxane.

The improvement in the process which is claimed herein is the addition of a crossover reagent to the polymerization mixture at the end of the polymerization of the vinyl aromatic hydrocarbon and/or conjugated diene to enhance the kinetics of the crossover reaction from the living polymer arms to the polymerization of the polydimethylsiloxane polymer blocks on the ends of those living arms. The crossover reagents which may be used to provide the advantages of the present invention include strained ring siloxanes, aldehydes, ketones, alkylene oxides and other epoxides. The preferred crossover reagent for use herein is 2,2,5,5-tetramethyl-2,5-disila-loxocyclopentane.

DETAILED DESCRIPTION OF THE INVENTION

As is well known, polymers containing aromatic unsaturation can be prepared by polymerizing a vinyl aromatic hydrocarbon monomer. These polymers may be prepared using anionic initiators or polymerization catalysts. Such polymers may be prepared using bulk, solution or emulsion techniques. In any case, the polymer will generally be recovered as a solid such as a crumb, a powder, a pellet or the like.

In general, when solution anionic techniques are used, polymers of vinyl aromatic hydrocarbons and/or conjugated dienes are prepared by contacting the monomer(s) to be polymerized simultaneously or sequentially with an anionic polymerization initiator such Group IA metals, their alkyls, amides, silanolates, naphthalides, biphenyls and anthracenyl derivatives. It is preferable to use an organo alkali metal (such as sodium or potassium) compound in a suitable solvent at a temperature within the range from −150° C. to 300° C., preferably at a temperature within the range from 0° C. to 100° C. Particularly effective anionic polymerization initiators are organo lithium compounds having the general formula:

$$RLi_n$$

wherein:

R is an aliphatic, cycloaliphatic, aromatic or alkyl-substituted aromatic hydrocarbon radical having from 1 to 20 carbon atoms; and n is an integer of 1-4.

Vinyl aromatic hydrocarbons which may be copolymerized include vinyl aryl compounds such as styrene, various alkyl-substituted styrenes, alkoxysubstituted styrenes, 2-vinylpyridine, 4-vinylpyridine, vinylnaphthalene, alkyl-substituted vinyl napthalenes and the like. Conjugated dienes may be used in place of the vinyl aromatic hydrocarbon to form polydiene/ polydimethylsiloxane polymers. The first block may also be multi-block with at least one vinyl aromatic hydrocarbon block and at least one conjugated diene block. Conjugated diolefins which may be polymerized anionically include those conjugated diolefins containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Conjugated diolefins containing from 4 to about 8 carbon atoms are preferred for use in such polymers.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, napthalene, toluene, xylene and the like;

hydrogenated aromatic hydrocarbons such as tetralin, decalin and the like; linear and cyclic ethers such as methyl ether, methyl ethyl ether, diethyl ether, tetrahydrofuran and the like.

For convenience, the polyvinyl aromatic hydrocarbons, polydienes and multiblocks of the two will be referred to hereafter as polystyrene. The polymerization reaction of styrene proceeds relatively quickly. It produces living polymer chains which can be represented as PS$^-$Li$^+$.

The next step in the process is the improvement which is claimed herein. The living polystyrene blocks are reacted with a crossover reagent to produce a species which can be represented as PS—(CA)$^-$—Li$^+$ where CA is the crossover reagent. When the claimed crossover reagents are used, this reaction takes place much faster and requires less monomer than the reaction from the living polystyrene arms to the polystyrene-polydimethylsiloxane species which can be represented as PS—[Si(Me)$_2$O$_2$—Si(Me)$_2$O$^-$Li$^+$ as discussed above. The reaction with the crossover reagent proceeds relatively quickly (for instance, when 2,2,5,5-tetramethyl-2,5-disila-1-oxocyclopentane is used, reaction times of from 15 to 60 minutes are common) as does the reaction between the PS—(CA)$^-$—Li$^+$ species and the siloxane monomer. Generally, the temperature should be in the range of from 60° to 120° C. to obtain good reaction rates.

The crossover reagents which can be used in the present invention include strained ring siloxanes, aldehydes, ketones, alkylene oxides and epoxides. Strained ring siloxanes are preferred because they will match stoichiometries with the siloxane monomer more closely, thereby reducing impurities which will be introduced with the siloxane monomer, especially when an excess is required. Strained ring siloxanes are cyclic siloxanes with unfavorable bond angles between ring atoms due to steric demands. Examples of these compounds include siloxane compounds having fewer than 6 atoms in the ring and substituted derivatives thereof. The preferred strained ring siloxane and the preferred crossover agent overall is 2,2,5,5-tetramethyl-2,5-disila-1-oxocyclopentane because of its due to a large number of ring substituents and because of its availability.

The next step in the process is to react the reaction product of the polystyrene blocks and the crossover reagent with hexamethylcyclotriloxane, siloxane, (Me$_2$SiO)$_3$, in the presence of a polar promoter. The molar ratio of living polymer blocks to crossover reagent is preferably from 1:1 to 1:10. This reaction proceeds much more rapidly than the reaction of living polystyrene arms and the siloxane monomer (i.e., on the order of 15 to 60 minutes). The molar ratio of siloxane monomer to living polymer may be but need not be more than 2:1, but at least 1:1 is required because each PS$^-$LI$^+$ chain must be capped. The polar promoter can be, for example, tetrahydrofuran, ethyleneglycoldimethylether, N,N,N',N'-tetramethylethylene diamine, etc. Its purpose is to decrease the reaction time of the hexamethylcyclotrisiloxane with the living polymer-crossover reagent species. Preferably, this reaction is carried out at a temperature of from 60 to 1200C and the amount of promoter used ranges from 100 ppm to 100% (when the promoter is used as the solvent). The temperature range is important because higher temperatures favor increased polymerization rates. The promoter concentration range is important because this also favors increased polymerization rates.

The final step is termination of polymerization. This can be accomplished by adding trimethylchlorosilane to the polymerization solution. Other methods of termination include adding dimethyldichlorosilane to synthesize triblock polymers.

Die out of the polymerization is very common when linear polymers of this type are made. This occurs because the polymerization reaction to produce the polydimethylsiloxane arms is very slow and because of impurities in the (Me$_2$SiO)$_3$ monomer. Die out leads to chain terminated homopolystyrene. In the present system, die out is dramatically decreased because the reaction takes place much faster with less siloxane monomer.

These polymers are useful in surface-inactive coatings and in impact modification of engineering thermoplastics.

EXAMPLES

Example 1

325 grams of cyclohexane, 62.5 grams of styrene and 10.4 millimoles of sec-butyl lithium were added to a 1 liter polymerization bottle. The polymerization was allowed to take place for 30 minutes at 50° C.

Next, 21 millimoles (3.4 grams) of the crossover reagent, 2,2,5,5-tetramethyl-2,5-disila-1-oxocyclopentane and 0.4 grams (1,000 ppm) of 1,2-diethoxyethane were added to the polymerization mixture. The mixture was heated to 80° C. until the color disappeared (30 minutes) and then it was cooled.

Next, 187.5 grams of hexamethylcyclotrisiloxane and an additional 23.5 grams of 1,2-diethoxyethane were added to the polymerization mixture. The mixture was heated at 80° C. for 4 hours. The polymerization was terminated by adding 21 millimoles (2.3 grams) of trimethylchlorosilane and heating the mixture at 80° C. for 1 hour.

The polystyrene-polydimethylsiloxane polymer produced had a polystyrene content of 25% and the peak molecular weights (styrene equivalent determined by GPC) of the two blocks were 6,000 and 18,000 respectively. The polymer was characterized by gel permeation chromatography (GPC) and by proton NMR.

Example 2

325 grams of cyclohexane, 62.5 grams of styrene and 6.25 millimoles of sec-butyl lithium were added to a 1 liter polymerization bottle. The polymerization was allowed to take place for 30 minutes at 50° C.

Next, 12.5 millimoles (3.4 grams) of the crossover reagent, 2,2,5,5-tetramethyl-2,5-disila-1-oxocyclopentane and 2.0 grams (1,000 ppm) of 1,2-diethoxyethane were added to the polymerization mixture. The mixture was heated to 80° C. until the color disappeared and then it was cooled.

Next, 212.5 grams of hexamethylcyclotrisiloxane and an additional 23.5 grams of 1,2-diethoxyethane were added to the polymerization mixture. The mixture was heated at 80° C. for 4 hours. The polymerization was terminated by adding 12.5 millimoles (1.4 grams) of trimethylchlorosilane and heating the mixture at 80° C. for 1 hour.

The polystyrene-polydimethylsiloxane polymer produced had a polystyrene content of 15% and the molecular weights of the two blocks were 6,000 and 34,000 respectively. The polymer was characterized by GPC and NMR as in Example 1.

Example 3

325 grams of cyclohexane, 62.5 grams of styrene and 6.25 millimoles of sec-butyl lithium were added to a I liter polymerization bottle. The polymerization was allowed to take place for 30 minutes at 50° C.

Next, 12.5 millimoles (3.4 grams) of the crossover reagent, 2,2,5,5-tetramethyl-2,5-disila-1-oxocyclopentane and 2.0 grams (1,000 ppm) of 1,2-diethoxyethane were added to the polymerization mixture. The mixture was heated to 80° C. until the color disappeared and then it was cooled.

Next, 212.5 grams of hexamethylcyclotrisiloxane and an additional 23.5 grams of 1,2-diethoxyethane were added to the polymerization mixture. The mixture was heated at 80° C. for 4 hours.

In this example, the polymer produced was coupled by adding 3.1 millimoles (0.40 grams) of dimethyldichlorosilane to the polymerization mixture and then heating it at 80° C. for 2 hours.

The polystyrene-polydimethylsiloxane polymer produced had a polystyrene content of 15% and the molecular weights of the three blocks were 6,000 and 68,000 and 6,000, respectively, since this coupled polymer is a PS-PDMS-PS triblock copolymer. The polymer was characterized by GPC and NMR as in Example 1.

I claim:

1. In a method for making a block copolymer of a polymer block of a vinyl aromatic hydrocarbon and/or a conjugated diene, and a block of polydimethylsiloxane by first anionically polymerizing a vinyl aromatic hydrocarbon and/or a conjugated diene to make a living polymer block and then adding hexamethylcyclotrisiloxane and a polar promoter to polymerize a polydimethylsiloxane block at the end of the living polymer block, the improvement which comprises first reacting the living polymer block with a crossover reagent which is a strained ring siloxane to decrease the crossover time from the living polymer block polymerization to the polydimethylsiloxane block polymerization.

2. The process of claim 1 wherein the crossover reagent is 2,2,5,5tetramethyl-2,5-disila-1-oxocyclopentane.

3. The process of claim 1 wherein the crossover reaction takes place at a temperature of 60 to 120° C. and the molar ratio of living polymer blocks to crossover reagent is from 1:1 to 1:10.

4. The process of claim 3 wherein the polymerization of the polydimethylsiloxane takes place at a temperature of from 60° to 120° C. and the molar ratio of hexamethylcyclotrisiloxane to living polymer is at least 1:1.

* * * * *